Dec. 1, 1964

J. W. GRAY 3,159,754

SWEEP AND FLYBACK CIRCUIT

Filed Aug. 3, 1962

INVENTOR.
JOHN W. GRAY

BY

*H. A. Mackey*

ATTORNEY.

United States Patent Office 3,159,754
Patented Dec. 1, 1964

3,159,754
SWEEP AND FLYBACK CIRCUIT
John W. Gray, Pleasantville, N.Y., assignor to General Precision, Inc., a corporation of Delaware
Filed Aug. 3, 1962, Ser. No. 214,693
6 Claims. (Cl. 307—88.5)

This invention relates to Doppler navigating systems for aircraft and particularly to circuits therein for acquiring an input Doppler signal.

A Doppler navigating system carried by an aircraft operates automatically to secure accurate ground speed and drift angle information. The system directs several microwave beams toward the earth and receives echoes of these beams containing Doppler information.

In order to track changing Doppler spectra and to measure their central frequencies the system employs a frequency tracker. This component receives the Doppler spectrum, locks to its center frequency and emits a signal representing it.

The Doppler frequency represents the aircraft ground speed and covers a commensurate range. Therefore acquisition circuits must be provided to aid the frequency tracker in acquiring the Doppler signal. These circuits include a signal-to-noise detector and a sweep and flyback circuit. The signal-to-noise detector measures the ratio of signal amplitude to noise amplitude and issues a command signal. The sweep and flyback circuit receives the command signal and, under its control, either causes the frequency tracker to track the signal or to sweep the frequency spectrum between its maximum and minimum limits. When, during sweeping, the frequency tracker intercepts a Doppler spectrum, the acquisition circuits cause the frequency tracker to discontinue sweeping, lock to the Doppler spectrum, track it and measure its central frequency.

Principles and component circuits of such systems are described in U.S. Patent 2,915,748 and in "Tranactions of the Institute of Radio Engineers," vol. ANE–4, December 1957, pp. 202–211.

During sweeping, the sweep and flyback circuit causes an oscillator in the frequency tracker to change its frequency, slowly, from the top end to the bottom end of its entire range, then causes the oscillator frequency to fly back rapidly to the starting end of its range. The present sweep and flyback circuit is novel in that the down sweep speed is retarded exponentially toward zero frequency as the asymptote. The sweep rate is thus not constant, but is proportional to the frequency. Since the width of a Doppler spectrum is proportional to its median frequency, the present circuit sweeps any Doppler spectrum, whatever its width, in a constant time. This results in maximum sweep speed consistent with maximum sensitivity in finding and locking to a Doppler signal.

The sweep and flyback circuit contains a transistor switch circuit which is sensitive to frequency, operating at adjustable high and low frequency limits. The switch circuit alternatively operates to apply one of two inputs to an integrator, one transmitting the sweep frequency and the other transmitting a powerful signal to cause rapid flyback. A third input to the integrator is taken from that portion of the frequency tracker which generates a signal representing the Doppler signal tracking error. This sweep and flyback circuit is an improvement over previous sweep and flyback circuits in having all three of these input circuits permanently connected to the integrator, instead of switching the inputs by means of electromagnetic relay contacts.

The purpose of this invention is to provide an improved sweep and flyback circuit for the efficient acquisition of a signal by a Doppler navigating system.

The invention may be more clearly understood from the following description and by reference to the accompanying drawings, in which.

Figure 1:
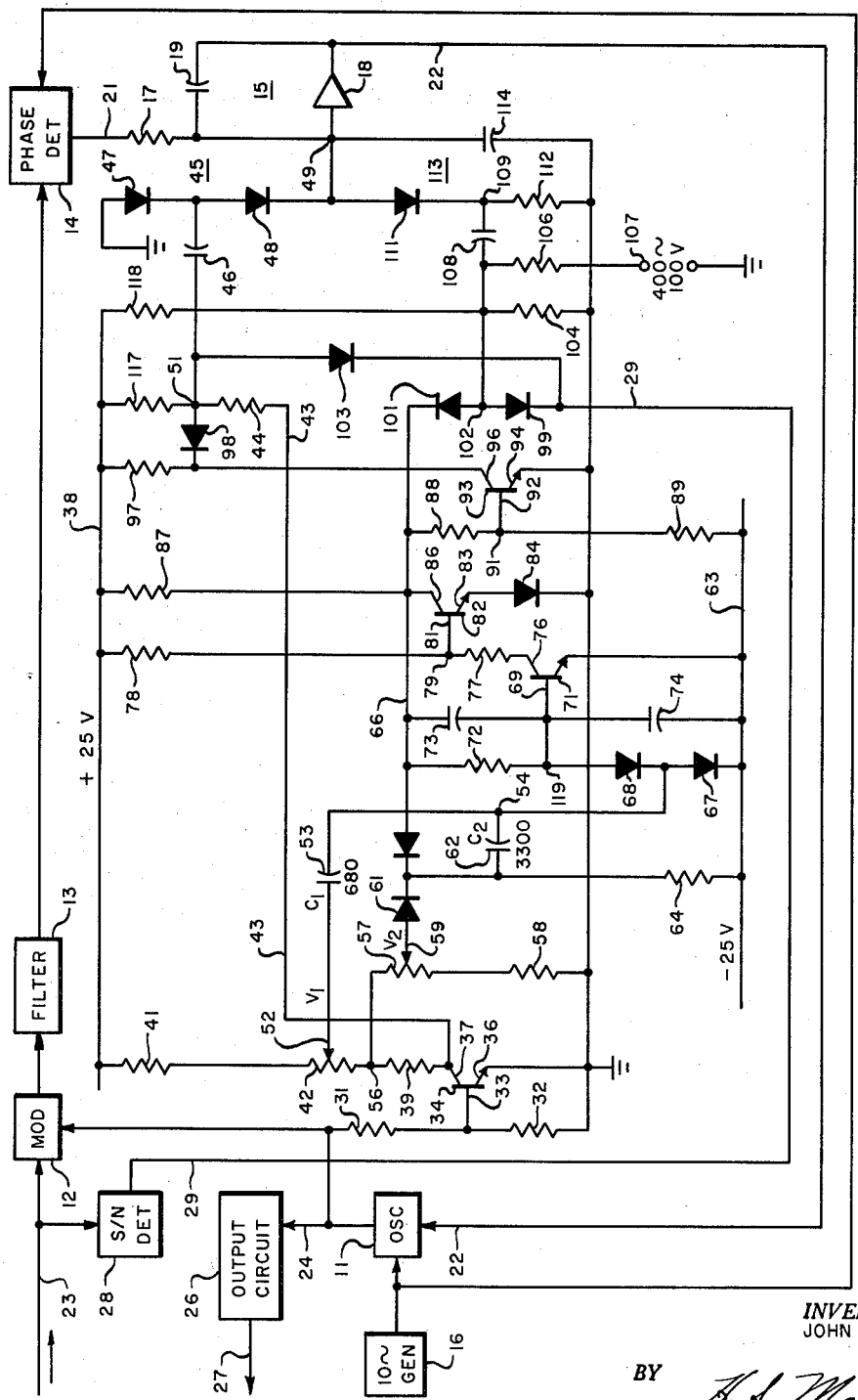
FIGURE 1 is a schematic diagram of an embodiment of the invention.

Referring now to FIGURE 1, a frequency tracker comprises a local oscillator 11, modulator 12, filter 13 and phase detector 14, all connected in tandem. A 10-c.p.s. generator 16 is connected to vary the frequency of the local oscillator over a selected range as a means for creating an error sense for continuously correcting the tracking of the frequency tracker. The frequency tracker also includes a Miller integrator 15 comprising a resistor 17, inverting high-gain amplifier 18 and capacitor 19. The output conductor 21 of the phase detector 14 is connected to the resistor 17 and furnishes one input to the integrator. The output conductor 22 of the integrator is connected to furnish a potential input to the local oscillator 11 for controlling its oscillating frequency. These connections place the integrator in tandem with the phase detector 14 and the local oscillator 11 and these components, together with the modulator 12 and filter 13, compose a closed loop termed the frequency tracker loop. The tracker input, applied to conductor 23 and obtained from a microwave transmitter-receiver (not shown), consists of a signal including the demodulated Doppler spectrum and noise. The output signal is taken from the output conductor 24 of the local oscillator 11, and is applied, through an output circuit 26, to an output conductor 27. This output signal consists of an alternating current having a frequency equal to or representing the median Doppler spectrum frequency.

An auxiliary component, for convenience termed the signal-to-noise detector 28, receives its input from the input conductor 23. This device computes the ratio of signal amplitude to noise amplitude and, at a selected threshold value, changes its emitted signal in conductor 29 from a +25-volt value, representing a weak signal or no signal, to grounded condition representing a Doppler signal amplitude greater than the threshold value.

The components so far described are not part of the sweep and flyback circuit except for the integrator, which has dual functions operating both as part of the frequency tracker and as part of the sweep and flyback circuit. The remaining components, now to be described, together with the integrator, compose the sweep and flyback circuit.

The output conductor 24 of the local oscillator 11 is connected through a network composed of resistors 31 and 32 to the base 33 of an amplifying transistor 34. Its emitter 36 is grounded and its collector 37 is connected to a positive source denoted by the bus 38 through resistors 39 and 41 and a potentiometer 42. The amplified signal is connected through conductor 43 and resistor 44 to a frequency-converting circuit 45 consisting of a capacitor 46 and two diodes 47 and 48. The function of this frequency-converting circuit 45 is to generate a direct current and apply it to junction 49, this current representing, by its magnitude, the frequency of the alternating current applied from junction 51 to the capacitor 46.

Such a circuit is described in Patent No. 2,584,866.

The potentiometer 42 provides a means for adjusting the upper sweep limit. Its slider 52 is coupled through a small capacitor 53 to a junction 54. The junction 56 of resistor 39 and potentiometer 42 is connected through a potentiometer 57 and resistor 58 to ground. The function of the potentiometer 57 is to provide a means of adjusting the lower sweep limit. The slider 59 of potentiometer 57 is connected to the anode of a diode 61 having its cathode coupled through a large capacitor 62 to the junction 54. The cathode of the diode 61 is also connected to a −25-volt bus 63 through a resistor 64. The function of the diode 61 is to act as a switch, opening the path between the slider 59 and the capacitor 62 when the potential of a conductor 66 is materially higher than that of the slider 59. Since the two capacitors 53 and 62 each have one side connected to the junction 54, and since on the other side of each they may be connected, through a resistor and a potentiometer, to the collector 37, they may be said to be connected in parallel when the diode 61 is conductive.

The junction 54 is connected through a solid-state diode 67 to the −25 v. bus 63 and through a solid-state diode 68 to the base 69 of a transistor 71. The base 69 is also connected through a resistor 72 to the conductor 66. Smoothing capacitors 73 and 74 are connected from the base 69 to the conductor 66 and to bus 63. The capacitors 53 and 62 in parallel, or capacitor 53 alone, together with diodes 67 and 68 constitute another frequency-converting circuit similar to the one previously described, here used for frequency measuring.

The collector 76 of transistor 71 is connected to the positive bus 38 through resistors 77 and 78. The common resistor junction 79 is connected to the base 81 of a transistor 82 having its emitter 83 connected to ground through a protective diode 84 and having its collector 86 connected to the conductor 66. The conductor 66 is connected to the positive bus 38 through a resistor 87. One function of the circuit including transistors 71 and 82 is to serve as a switch to apply either +25 volts or ground potential to the conductor 66.

The conductor 66 is connected to the negative bus 63 through resistors 88 and 89. The common junction 91 of these resistors is connected to the base 92 of a transistor 93 having its emitter 94 grounded and its collector 96 connected through a resistor 97 to the positive bus 38. The collector 96 is also connected through a diode 98 to the junction 51. The function of the transistor 93, in combination with the transistors 71 and 82 and the diode 98, is to serve as a switch which, during one part of the sweep and flyback cycle, grounds the junction 51.

In the operation of the switch including transistors 71, 82 and 93, when transistor 71 is fully conducting, so is transistor 93 while transistor 82 is rendered nonconducting. The reverse is true also; when transistor 71 is in its nonconducting condition so is transistor 93, while transistor 82 is fully conducting. The combination of transistors 71 and 82 behaves like an on-off switch because of a positive feedback path from the collector 86 through conductor 66 and resistor 72 to the base 69.

The signal-to-noise detector 28 output is connected, through its output conductor 29, to two diodes 99 and 101, connected in opposition at the common junction 102. The cathode of diode 101 is connected to the conductor 66. A third diode 103 connects the conductor 29 to the junction 51. The junction 102 is connected through a resistor 104 to ground and through a resistor 106 to a source of 400 c.p.s. power at 110-volt potential represented by terminal 107.

The junction 102 is also coupled through a capacitor 108 to the common junction 109 of a diode 111 and a grounded resistor 112. The anode of diode 111 is connected to junction 49. The capacitor 108, diode 111 and resistor 112 constitute a frequency-converting circuit 113 in which the resistor 112 takes the place of the diode usually used in this position. The function of this frequency-converting circuit 113 is to apply a current to junction 49 which is proportional to the 400-c.p.s. alternating-current frequency applied to the capacitor 108 multiplied by the capacitance of capacitor 108 and the peak-to-peak charging potential applied thereto. A smoothing capacitor 114 is connected between junction 49 and ground.

It is pointed out that this frequency-converting circuit 113, the frequency-converting circuit 45, and the output of the phase detector 14 are all connected directly to the input junction 49 of the integrator 15, without the use of electromagnetic relays or the interposition of relay contacts as has heretofore been the practice. This improved circuit configuration completely segregates the operations of these three circuits connected to the integrator input during their several functions of sweeping, flyback and tracking. When the system is in its sweeping or flyback mode, there is substantially no current in conductor 21 and the current from circuit 45 or from circuit 113 controls the integrator. When the system is in its tracking mode, it is essential for accuracy that the only current input to the integrator is from the phase detector, and that any leakage currents from the circuits 45 and 113 are substantially zero. This is actually accomplished by these circuits and if any leakage currents at all exist, they are less than $10^{-9}$ ampere in magnitude and their effect on measurement of the tracked Doppler frequency is completely negligible.

In the operation of the circuit of FIGURE 1, it is desired to have an exponential sweep for greatest economy of sweep time combined with greatest sensitivity to weak Doppler signals, as explained. Such a sweep form is shown by the downgoing solid frequency-time curve 116 of FIGURE 2, having the equation $$f = Ae^{-kt} \tag{1}$$

In this equation $f$ is frequency, $A$ is the maximum value of $f$, $t$ is time and $k$ is a constant. The curve is asymptotic to the zero-frequency line. This is in contrast to earlier circuits of this kind in which the falling frequency curve is asympototic to a line representing a control potential value applied to the oscillator, this line not necessarily or usually being identical to the zero-frequency line.

The general expression is $$\frac{df}{dt} = -kf \tag{2}$$

of which Equation 1 is the solution. It is seen that the behavior of the circuit of FIGURE 1 is described by this Equation 2, for during sweep the integrator 15 and other elements are connected to form a closed loop, the output of one being the input of the other. This action through the integrator is described by $$f = -k\int f\,dt \tag{3}$$

which, differentiated, becomes Equation 2.

The novel circuit configuration which causes sweep operation to scan exponentially to a zero-frequency asymptote consists of a closed loop in which the oscillator 11, frequency-converting circuit 45 and the integrator 15 are connected in tandem and in which the output conductor 22 of the integrator 15 is connected back to the input of the oscillator 11. These components thus compose a closed loop which obeys the above Equation 3, exponentially reducing its frequency toward zero frequency at a continuously decreasing rate as stated by the equation. That is, the oscillator output frequency through the integrator produces a voltage which controls the oscillator frequency. Therefore, each reduction of oscillator frequency reduces the integrator input rate and output voltage, which in turn further reduces the oscillator frequency.

When the frequency tracker is engaged in tracking a strong Doppler spectrum, the phase detector 14 may apply a small error signal through conductor 21, or a zero signal, to the integrator 15, causing its output to change slowly or to be constant. This causes the local oscillator 11 output frequency to change slowly to correct the error, or to be constant. The strong Doppler signal applied to the signal-to-noise detector 28 causes its output conductor 29 to be grounded. This causes the diode 103 to become conductive, current flowing from the positive source bus 38 through resistor 117, diode 103 and conductor 29 to ground. This places the junction 51 at ground potential, immobilizing the frequency-converting circuit 45 so that its current flow applied to junction 49 is zero. Thus this input to the integrator 15 is effectively open circuited. Also a current path is established from bus 38 through resistor 118, diode 99 and conductor 29 to ground, grounding junction 102. This immobilizes the frequency-converting circuit 113 so that its current flow applied to junction 49 is zero. Thus also this input to the integrator 15 is effectively open circuited.

The reduction to zero of currents applied by circuits 45 and 113 to the junction 49, as just described, depends largely on the fact that the potential of point 49 is always held close to zero in this circuit configuration, never departing from ground potential by more than a few millivolts at any time. In addition, when silicon diodes are used in circuits 45 and 113, the standoff voltage, which is an inherent property of any silicon diode, aids in the high degree of isolation of the junction 49 which is attained during tracking.

Figure 2:
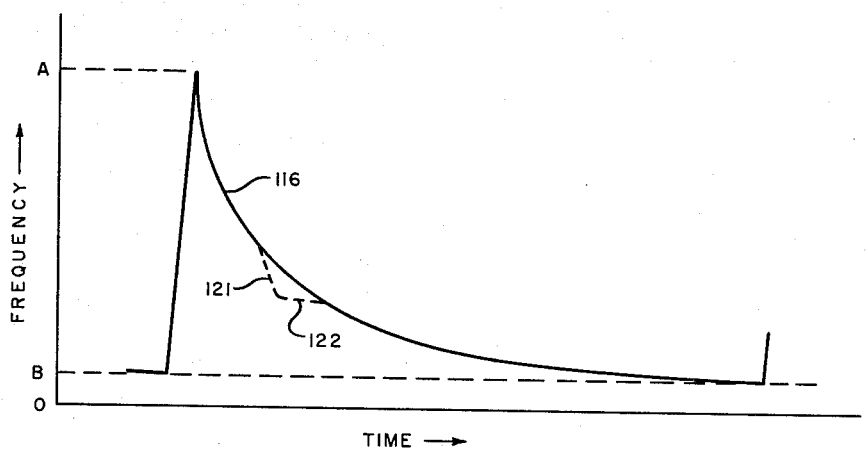
FIGURE 2 is a graph of the sweep and flyback frequencies.

At this time the central frequency of the Doppler spectrum being tracked is, by definition, at some value between A and B, FIGURE 2, in which A is the upper frequency limit corresponding to an upper aircraft speed limit and B is the lower frequency limit corresponding to a lower aircraft speed limit. This central frequency is represented by the frequency of the output of oscillator 11. This output is amplified in transistor 34 and coupled through capacitors 53 and 62 to junction 54. These capacitors and diodes 67 and 68, constituting a frequency-measuring circuit, generate a positive current at junction 119 which is greater than that which can pass through resistor 72, and therefore current tends to be drawn from base 69, making transistor 71 nonconductive. Transistor 82, being conductive, grounds conductor 66 and, through diode 101, grounds junction 102. Transistor 93 being nonconductive, causes diode 98 to be nonconductive.

If the Doppler signal is lost the output of the signal-to-noise detector 28 changes from ground potential to +25-volt potential. This causes diodes 99 and 103 to become nonconductive, freeing junction 51, which assumes a fraction of the alternating signal existing at collector 37 of the transistor amplifier 34. This is translated by the frequency-converting circuit 45 into positive current flowing from diode 48 through junction 49 into the amplifier 18. This causes the output potential of the integrator 15 to decrease and this decrease, applied to the oscillator 11, causes it to sweep down in frequency. Thus the sweep 116, FIGURE 2, is started. At this time the conductor 21 carries no signal and is effectively open, since there is no Doppler signal and hence no Doppler error signal.

The reduction of frequency of the oscillator output signal applied to the frequency measuring circuit consisting of capacitors 53 and 62 and diodes 67 and 68 reduces the current, $i_s$, through diode 68 until it equals the current through resistor 72, and then becomes slightly lower. Before this point is reached the current through diode 68 is $$i_s = f(V_1 C_1 + V_2 C_2) \quad (4)$$

in which $V_1$ is the potential of slider 52, $C_1$ is the capacitance of capacitor 53, $V_2$ is the potential of slider 59 and $C_2$ is the capacitance of capacitor 62. When the current in resistor 72 becomes larger than that through diode 68, current flows into base 69 and the transistor 71 rapidly becomes completely conductive. The potential of conductor 66 rises, making diode 61 nonconductive and taking the capacitor 62 out of the signal circuit. The current through diode 68 is now described by $$i_t = f V_1 C_1 \quad (5)$$

The rise of potential of conductor 66 makes diode 101 nonconductive, freeing the junction 102 from ground and freeing the frequency-converting circuit 113. Transistor 93, being conductive, grounds junction 51 and immobilizes the frequency-converting circuit 45.

A large current from the 400-cycle source now flows during negative half cycles through diode 111 in the frequency-converting circuit 113, causing large current to be drawn from capacitor 19 and causing current to tend to be drawn from the input of amplifier 18. This causes the output potential of the integrator 15 in conductor 22 to rise very rapidly and linearly, causing flyback of the oscillator frequency from its lower limit B to its upper limit A.

At the upper limit of flyback the current, $i_t$, in Equation 5, becomes large enough again to overbalance the current through the resistor 72, causing the transistors 71 and 93 to become nonconductive and transistor 82 conductive. This grounds the input of circuit 113 and releases the input of circuit 45, terminating the flyback and causing the sweep to recommence.

If, during sweep, a Doppler signal is encountered, the signal-to-noise detector output again becomes grounded, immobilizing both the sweep frequency-converting circuit 45 and the flyback frequency-converting circuit 113, and an error signal which appears at conductor 21 takes control of the integrator 15. The frequency tracker thereupon is locked to the Doppler signal central frequency and commences tracking it.

During this acquisition operation the present circuit has a special advantage. As the oscillator frequency sweeps down the curve 116, FIGURE 2, decreasing current is applied to junction 49 from the frequency-converting circuit 45. When the frequency tracker loop begins to encounter a Doppler spectrum, the phase detector begins to emit a small current in conductor 21. This at first is in the same sense at junction 49 as the current from frequency-converting circuit 45, and causes the integrator 15 output potential to drop more rapidly, in turn causing the oscillator 11 frequency to drop more rapidly. This is indicated in FIGURE 2 by the dashed line 121 having a greater slope than the solid line at the same instant of time. As the frequency tracker loop passes the peak of the Doppler spectrum signal, the sign of the error signal current in conductor 21 reverses, and is opposite to the sign of the signal from frequency-converting circuit 45. The integrator and oscillator output slopes therefore become less, as shown by the nearly horizontal dashed line 122, FIGURE 2. Finally, the frequency tracker signal may even override the frequency-converting circuit signal and, by the time the signal-to-noise circuit operates, placing the system in the tracking mode, the frequency tracker has caused its output at conductor 27 to become a very accurate measure of the frequency of the center of the Doppler spectrum. This action thus facilitates rapid sweeping yet with retarded, positive and accurate locking to a Doppler spectrum of the weakest kind.

What is claimed is:
1. A sweep and flyback circuit comprising,
   frequency tracker means including an integrator, voltage-controlled oscillator and detector, the output of the detector being permanently connected to the input of the integrator and the output of the integrator being permanently connected to a voltage-controlled input of the oscillator,
   a sweep frequency-to-current converter having its output permanently connected to said integrator input and its input connected through a switch to said oscillator output,
   a flyback frequency-to-current converter permanently connected to said integrator input and to an alternating current source on actuation of said switch to a preselected state,
   and frequency-measuring means connected to said oscillator output for operation of said switch whereby at a low frequency limit said sweep frequency-to-current converter is disabled and said flyback frequency-to-current converter is connected to said alternating current source and whereby at a high frequency limit said flyback frequency-to-current converter is dis- abled and said sweep frequency-to-current converter is connected to said oscillator output producing a sweep which exponentially approaches a selected frequency as asymptote.

2. A sweep and flyback circuit comprising, frequency tracker means including an integrator, voltage-controlled oscillator, phase detector and signal-to-noise detector, the output of the phase detector being connected to the input of the integrator, the output of the integrator being connected to a voltage-controlled input of the oscillator and the output of the signal-to-noise detector being connected to actuate an electronic switch, a sweep frequency-to-current converter having its output connected to said integrator input and its input connected through said electronic switch to said oscillator output, a flyback frequency-to-current converter having its output connected to said integrator input and its input connected to an alternating current source on actuation of said electronic switch to a preselected state, and frequency-measuring means connected to measure the frequency of said oscillator and connected to operate said electronic switch for connecting said flyback frequency-to-current converter at a selected low frequency limit and for connecting said sweep frequency-to-current converter at a selected high frequency limit producing a sweep which exponentially approaches a selected frequency as asymptote, whereby said signal-to-noise detector at a selected threshold signal strength overrides said frequency-measuring means and operates said switch to disable both said sweep frequency-to-current converter and said flyback frequency-to-current converter.

3. A sweep and flyback circuit comprising, frequency tracker means including an integrator, voltage-controlled oscillator, phase detector and signal-to-noise detector, the output of the phase detector being connected to the input of the integrator, the output of the integrator being connected to the voltage-controlled input of the oscillator and the output of the signal-to-noise detector being connected to actuate an electronic switch, a sweep frequency-to-current converter having its output connected to said integrator input and its input connected through said electronic switch to said oscillator output, a flyback frequency-to-current converter having its output connected to said integrator input and its input connected to an alternating current source on actuation of said electronic switch to a preselected state, and solid-state frequency measuring means connected to measure the frequency of said oscillator and connected to operate said electronic switch to connect said flyback frequency-to-current converter and disconnect said sweep frequency-to-current converter at a selected low frequency limit and connected to operate said electronic switch to disconnect said flyback frequency-to-current converter and connect said sweep frequency-to-current converter at a selected high frequency limit causing a sweep exponentially approaching a selected frequency as an asymptote, and whereby said signal-to-noise detector at a selected threshold signal strength overrides said frequency measuring means.

4. A sweep and flyback circuit as described in claim 3 in which said selected frequency asymptote is zero frequency.

5. A sweep and flyback circuit comprising, frequency tracker means including an integrator, voltage-controlled oscillator, phase detector and signal-to-noise detector, the output of the phase detector being connected to the input of the integrator, the output of the integrator being connected to the voltage-controlled input of the oscillator and the output of the signal-to-noise detector being connected for overriding actuation of a solid-state switch above a selected threshold signal-to-noise ratio amplitude, a sweep frequency-to-current solid-state converter having its output connected to said integrator input and its input connected through said switch to said oscillator output, a flyback frequency-to-current solid-state converter connected to said integrator input and to an alternating current source on actuation of said switch to a preselected state, and a solid-state frequency measuring circuit connected to measure the frequency of said oscillator and to emit a current representative thereof, said current operating said switch to connect said flyback converter and disconnect said sweep converter at a selected low-frequency limit and operating the switch to disconnect said flyback converter and connect said sweep converter at a selected high frequency limit causing a sweep exponentially approaching zero frequency as an asymptote.

6. A sweep and flyback circuit comprising, frequency tracker means including a closed loop having a modulator, filter, phase detector, integrator and voltage-controlled oscillator connected in tandem during its tracking mode of operation, said integrator being of the Miller type including an amplifier having a resistor input with a capacitor shunting the amplifier, the output of the phase detector being permanently connected to the resistor input of the integrator and the output of the integrator being permanently connected to the voltage-controlling input of the oscillator.

a signal-to-noise detector associated with said frequency tracker closed loop and actuated by Doppler and noise signals applied to the modulator thereof, the output of the signal-to-noise detector being connected for overriding actuation of a solid-state switch above a selected threshold signal-to-noise ratio amplitude, a sweep frequency-to-current solid state converter permanently connected to the input of said integrator amplifier and having its frequency input connected through said switch to said oscillator output, a flyback frequency-to-current solid state converter permanently connected to the input of said integrator amplifier and having its frequency input connected to an alternating current source on actuation of said switch to a preselected state, a solid-state frequency measuring circuit having its frequency input connected to said oscillator output and emitting a current representing the frequency thereof, said measuring circuit being connected to said switch for operation thereof in opposite senses at two selected frequencies of the oscillator, whereby at one of said selected frequencies said sweep converter is introduced into a closed loop circuit with said integrator and said oscillator to form an exponentially falling sweep frequency asymptotic to zero frequency, and potentiometer means for adjusting the values of said two selected frequencies.

References Cited in the file of this patent
UNITED STATES PATENTS 3,039,063     Blumenfeld et al. _____ June 12, 1962